United States Patent
Bunte et al.

(10) Patent No.: US 9,544,258 B2
(45) Date of Patent: Jan. 10, 2017

(54) NETWORK, HEAD SUBSCRIBER AND DATA TRANSMISSION METHOD

(71) Applicant: Beckhoff Automation GmbH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 0 days.

(21) Appl. No.: 14/747,855

(22) Filed: Jun. 23, 2015

(65) Prior Publication Data
US 2015/0381538 A1    Dec. 31, 2015

(30) Foreign Application Priority Data
Jun. 27, 2014    (DE) .................. 10 2014 109 060

(51) Int. Cl.
*H04L 12/58*    (2006.01)
*H04L 12/24*    (2006.01)
(Continued)

(52) U.S. Cl.
CPC ............ *H04L 51/12* (2013.01); *H04L 12/403* (2013.01); *H04L 12/413* (2013.01);
(Continued)

(58) Field of Classification Search
CPC ............ H04J 3/085; H04L 41/08; H04L 41/12
See application file for complete search history.

(56) References Cited

U.S. PATENT DOCUMENTS 6,661,800 B1 * 12/2003 Hayama .................. H04L 12/42
                                                                 370/249
7,933,218 B2 *  4/2011 Almgren ............. H04W 52/346
                                                                 370/252
(Continued)

FOREIGN PATENT DOCUMENTS

CN         1565108 A    1/2005
CN       102014102 A    4/2011
(Continued)

OTHER PUBLICATIONS

German Office Action from related German patent application No. DE 102014109060.8, Applicant Beckhoff GmbH, mailed Feb. 13, 2015 (5 pages).
(Continued)

*Primary Examiner* — Lashonda Jacobs
(74) *Attorney, Agent, or Firm* — Dorsey & Whitney LLP

(57) ABSTRACT

In a network, a control node is connected to a plurality of network subscribers via a closed ring-shaped data path, wherein the network subscribers form a chain, starting from the control node, with a head subscriber as a termination for the chain. The ring-shaped data path transits through the network subscribers on an outbound route and an inbound route, wherein the network subscribers are designed to perform data interchange both on the outbound route and on the inbound route with data messages circulating on the ring-shaped data path. The control node is additionally designed such that it outputs data messages with an identifier on the data path, wherein the head subscriber has a filter function to use a prescribed identifier to block the further transport of data messages with the corresponding identifier on the inbound route following transit of data messages through the head subscriber on the outbound route.

14 Claims, 5 Drawing Sheets

(51) Int. Cl.
*H04L 12/423* (2006.01)
*H04L 12/403* (2006.01)
*H04L 12/413* (2006.01)

(52) U.S. Cl.
CPC ............ *H04L 12/423* (2013.01); *H04L 41/12* (2013.01); *H04L 51/14* (2013.01)

(56) References Cited

U.S. PATENT DOCUMENTS

| | | | |
|---|---|---|---|
| 2001/0038608 A1* | 11/2001 | De Girolamo | H04Q 11/0062 370/223 |
| 2002/0019883 A1* | 2/2002 | Stiegler | H04L 12/42 709/251 |
| 2002/0077788 A1* | 6/2002 | Ohashi | H04N 7/181 702/188 |
| 2003/0055900 A1* | 3/2003 | Glas | H04J 3/0664 709/205 |
| 2003/0076781 A1* | 4/2003 | Enomoto | H04L 47/10 370/229 |
| 2005/0198373 A1 | 9/2005 | Saunderson | |
| 2006/0256080 A1* | 11/2006 | Srinivasan | H04L 67/38 345/156 |
| 2010/0014417 A1* | 1/2010 | Zhou | H04J 3/085 370/223 |
| 2010/0329267 A1* | 12/2010 | Sakamoto | G06T 1/20 370/400 |
| 2011/0261681 A1* | 10/2011 | Wu | H04L 12/40045 370/223 |

FOREIGN PATENT DOCUMENTS

| | | |
|---|---|---|
| CN | 103828306 A | 5/2014 |
| DE | 10 2004 063 213 A1 | 7/2006 |
| DE | 102006046841 A1 | 4/2008 |
| EP | 1860821 A1 | 11/2007 |
| EP | 2439885 A1 | 4/2012 |

OTHER PUBLICATIONS

First Chinese Office Action for related Chinese Patent Application No. 201510369696.X, mailed Sep. 5, 2016 (4 pages).

* cited by examiner

NETWORK, HEAD SUBSCRIBER AND DATA TRANSMISSION METHOD

CROSS-REFERENCE TO RELATED APPLICATIONS

This application claims priority to German Patent Application DE 10 2014 109 060.8, filed Jun. 27, 2014, entitled NETZWERK, KOPF-TEILNEHMER UND DATENÜBERTRAGUNGSVERFAHREN, which is incorporated by reference herein, in the entirety and for all purposes.

FIELD

The invention relates to a network having a control node and a plurality of network subscribers that are connected to the control node via a closed ring-shaped data path that passes through the network subscribers both on the outbound route and on the inbound route. The invention additionally relates to a head subscriber that forms the termination of the chain of network subscribers starting from the control node. In addition, the invention relates to a data transmission method for such a network.

BACKGROUND

In industrial automation, serial bus systems are used for communication between the sensor/actuator level and the control level. Serial bus systems of this kind, also called field buses in industrial automation, are subject to high communication requirements in relation to transmission speed and freedom from error. The sensor/actuator level and the control level have process states, i.e. sensor data and actuator commands, transmitted between them in real time. This data interchange normally takes place cyclically. Besides cyclic data interchange of this kind, acyclic data are also transmitted between the sensor/actuator level and the control level, however, for example in order to transfer parameters to the devices of the sensor/actuator level or to query status data.

The data interchange on a field bus is normally executed on the basis of the master/slave principle. The active bus subscribers, generally the control nodes of the control level, are in possession of bus access authorization and determine the data transfer. By contrast, the sensors and actuators are usually the passive bus subscribers. They are not provided with bus access authorization, i.e. they can only acknowledge received information signals or transmit information signals to a control node upon a request from the latter.

The information signals are sent by the control nodes generally in the form of data messages that are made up of control data and useful data, the data messages preferably being designed on the basis of the Ethernet standard. The sensors and actuators connected to the bus process the useful data intended for the respective device that are in the data messages fed onto the bus by the control node.

Field bus systems having a master/slave structure are normally, in order to avoid complex wiring, designed using ring topology, with all network subscribers being connected to a ring-shaped data path. A data message produced by a control node is fed into the data path by the control node and successively transits through the further network subscribers serially connected to the data path so as then to be received by the control node again.

In order to allow high data transmission rates in the network, a full-duplex mode is preferably executed. In this case, the ring-shaped data path is made up of an outbound route and an inbound route that connects the network subscribers and thus permits simultaneous sending and receiving by the network subscribers. The network is designed such that starting from the control node the network subscribers form a chain with a head subscriber as a termination, with the ring-shaped data path transiting through the network subscribers on both the outbound route and the inbound route. The network subscribers can then perform data interchange with data messages that are fed onto the data path by the control node both on the outbound route and on the inbound route.

Owing to the increasing data transmission rates—in Ethernet networks, a data transmission rate of 1 Gbit/s is increasingly being used instead of the usual data transmission rate of 100 Mbit/s—the delay time for the data messages through the network subscribers is gaining ever greater significance for data interchange speed between the sensor/actuator level and the control level.

In industrial automation, the control using data interchange via networks is normally effected such that the control node cyclically performs control processes in order to ascertain output data for the sensor/actuator level on the basis of input data of the sensor/actuator level. Following termination of a control process cycle, the control node sends the output data in the form of data messages, wherein the network subscribers read the output data associated with the respective network subscriber and then use these output data to execute a local network subscriber process. The data ascertained with these local network subscriber processes are then returned to the control node by the network subscribers and subsequently used as input data for the next control process cycle by the control node.

In this case, the output data from the data messages that are output by the control node are read in by the network subscribers on the outbound route of the data path. The input data provided by the network subscribers are read into this or a further data message sent by the control node on the inbound path and fed back to the control node. Since the transit time through the network subscribers, during which the data are read out and in, cannot be shortened to the same extent as the data transmission rate in the network is increased, the shortest cycle time for a control process by the control node is increasingly determined by the circulation time for the data messages on the ring-shaped data path, which circulation time is obtained on the basis of the transit time through the network subscribers.

SUMMARY

It is an object of the present invention to provide a network having a ring-shaped data path in full-duplex mode and a data transmission method for such a network that allows the cycle time for control processes to be shortened.

This object is achieved with a network, a head subscriber for use in such a network and a transmission method. Preferred developments thereof are specified in the dependent claims.

EXAMPLES

In a network, a control node is connected to a plurality of network subscribers via a closed ring-shaped data path, wherein the network subscribers form a chain, starting from the control node, with a head subscriber as a termination for the chain. The ring-shaped data path transits through the network subscribers on an outbound route and an inbound route, wherein the network subscribers are designed to perform data interchange both on the outbound route and on the inbound route with data messages circulating on the ring-shaped data path. The control node is additionally designed such that it outputs data messages with an identifier on the data path, wherein the head subscriber in the chain has a filter function in order to use a prescribed identifier to block the further transport of data messages with the corresponding identifier on the inbound route following transit of data messages through the head subscriber on the outbound route. The head subscriber furthermore has a transmission functionality in order to additionally output data messages on the inbound route at a prescribed instant.

With the design of the head subscriber in a network that is operated in full-duplex mode, with two additional functionalities, a filter functionality that is used to remove particular data messages from the data path following transit on the outbound route of the data path and a transmission functionality that is used to output additional data messages onto the inbound route of the data path at prescribed instants, the transit time for process data in a control cycle in the network can be shortened.

The data messages that are used to transmit process data in a control cycle from the control node to the network subscribers of the sensor/actuator level are no longer fed back to the control node. The reason is that following transit on the outbound route of the data path the data messages are filtered out by the head subscriber on the basis of their identifier. Instead of the data messages sent by the control node, independent data messages, which are output onto the inbound route by the head subscriber, are used to collect the process data of the network subscribers on the inbound route of the data path.

The writing of process data to the sensor/actuator level and the reading of process data from the sensor/actuator level can therefore be effected independently of one another, since the associated data messages are independent and are processed on the different routes of the data path by the network subscribers of the sensor/actuator level. This gives rise to the option of executing the read and write operation for the process data in the sensor/actuator level at the optimum instant, e.g. including with an overlap, and hence shortening the transit time for the process data for a control process cycle, which allows faster performance of control processes in industrial automation.

This advantage is obtained particularly when the control node is designed to cyclically perform a control process in order to ascertain output data for the network subscribers on the basis of input data of the network subscribers, wherein the control node, following termination of the control process, outputs the output data in the form of a write data message onto the outbound route of the data path. The network subscribers, on transit of the write data message on the outbound route of the data path, then read the output data associated with the respective network subscriber from the write message. Each network subscriber subsequently takes the output data as a basis for cyclically performing a local network subscriber process, with input data for the next control process cycle of the control node then being obtained from this network subscriber process.

The head subscriber in the chain, following transit of the write data message, blocks the write data message and prevents further transport on the inbound route of the data path. In addition, the head subscriber outputs a read data message on the inbound route of the data path at a prescribed instant, wherein the network subscribers, on transit of the read data message on the inbound route of the data path, write the input data of the network subscriber for the next control process cycle into the read data message. Since the write data messages do not block the inbound route of the data path, suitable timing when the read data message is transmitted by the head subscriber allows the data to be read in and out in the sensor/actuator level with an overlap. The transit time for the process data that are required for the control processes of the control node can therefore be shortened and hence the cycle time for the control process can be reduced.

The instant for output of a read data message onto the inbound route of the data path by the head subscriber is preferably chosen such that a data area associated with a network subscriber in the read data message runs through the relevant network subscriber only following termination of the network subscriber process. This transmission of the read data message by the head subscriber in time-coordinated fashion makes it possible to ensure that the input data for the next control process cycle of the control node are reliably fetched.

Shortening the transit times for the process data for a control process of the control node can additionally be achieved by virtue of the control node arranging the output data in the write data message such that the output data for the network subscribers are sorted in reverse order with respect to the order of the network subscribers in the chain along the data path, with the output data for the head subscriber first. With this sorting of the output data in the write data message, the output data associated with the individual network subscribers transit through the network subscriber essentially at the same time. The network subscribers can therefore read in their output data essentially simultaneously and start the local network subscriber process. In that case, the input data for the next control process cycle of the control node that are obtained from the network subscriber process are also available early and can be fetched using a read data message that is transmitted by the head subscriber.

The control node is additionally designed such that a separate checksum is ascertained for the output data from each network subscriber and is included in the transmission in the write data message together with the output data from each network subscriber. The network subscriber can then, following reception of its output data, use the checksum to immediately decide whether the data transmission has been effected in error-free fashion, and therefore does not need to await the transit of the whole write data message in order to perform this check and then to start the relevant network subscriber process.

It is additionally advantageous if the head subscriber arranges the data areas provided for the network subscribers in the read data message such that the input data of the network subscriber are sorted in the read data message in the order of the network subscribers in the chain, with the input data of the head subscriber last. This design of the read data message provides the opportunity to optimize the timing of the fetch operation for the input data provided by the network subscribers for the next control cycle of the control node, particularly when these input data, which are obtained from the local network subscriber processes, are available essentially simultaneously. The input data can then be coupled into the read data message essentially in parallel, which allows the process data transit time and hence the control cycle to be shortened further.

As a security measure for checking whether the addressed network subscribers process the data messages from the control nodes correctly, the data messages transmitted by the control node are provided with a register field that contains a starting value. Each network subscriber is designed such that it increments the register field for a data interchange with the corresponding data message. In the case of data messages that the head subscriber blocks on the outbound route from further transport on the inbound route using the prescribed identifier, the head subscriber then reads the value of the register field of the blocked data message and buffer-stores this value. The buffer-stored value is then sent to the control node at a later instant with a data message that is output onto the inbound route by the head subscriber. The control node can then use the value of the register field to establish whether the data message filtered out by the head subscriber has been handled correctly by the network subscribers.

In the head subscriber, it is possible for the additional functionalities, i.e. the filter functionality and the transmission functionality, to be adjusted. This is preferably accomplished via a configurable message memory of the head subscriber. The message memory contains the identifiers of the data messages that need to be blocked from being forwarded on the inbound route of the data path and the prescribed instants for the output of data messages on the inbound route. This configurable message memory provides the opportunity for the control node to adjust the head subscriber in optimum fashion for the control process for this to be performed in order to shorten the transit time for the process data of the control process onto the data path.

In order to avoid collisions between data messages particularly on the inbound route, the head subscriber additionally has a buffer store that is designed to buffer-store data messages that are sent acyclically by the control node if forwarding of the data message that is sent acyclically by the control node on the inbound route of the data path collides with a data message that is to be sent on the inbound route by the head subscriber. This approach ensures that the cyclic data interchange that is required for real-time capability can be performed reliably and without error.

BRIEF DESCRIPTION OF THE DRAWINGS

The invention is explained in more detail with reference to the appended drawings.

DETAILED DESCRIPTION

Figure 1:
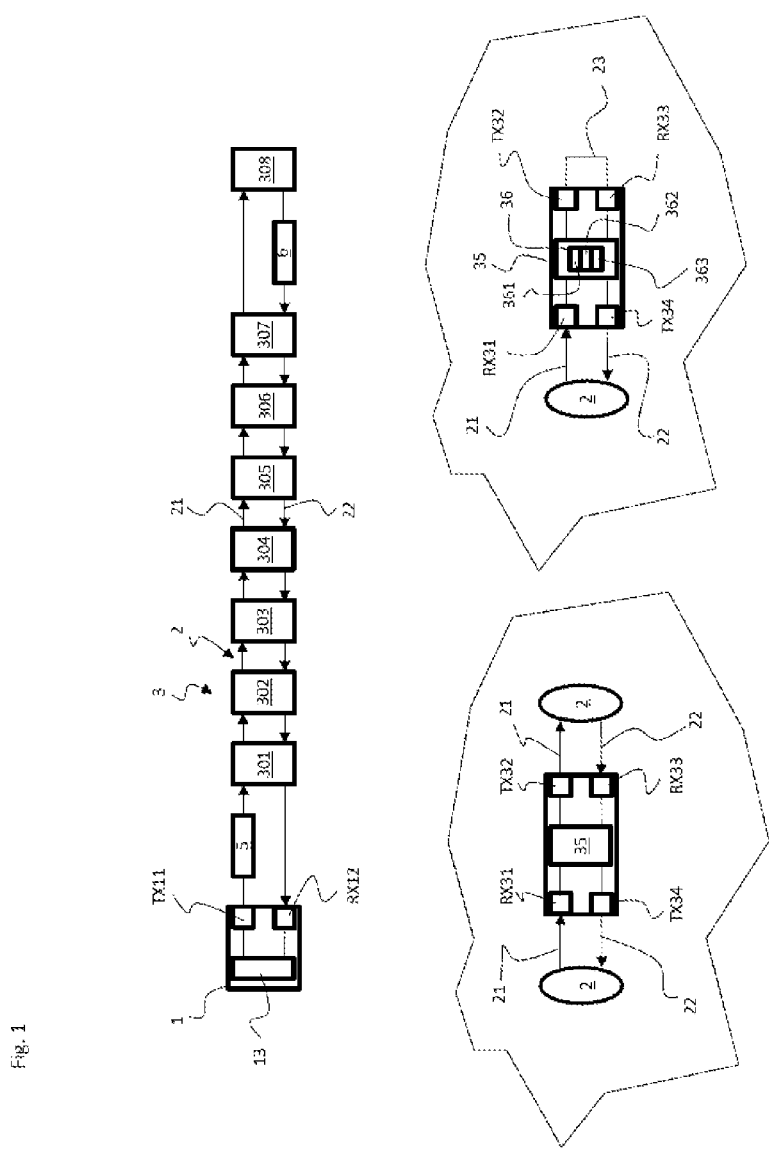
FIG. 1 shows a schematic illustration of a network according to the invention with a control node and a chain of eight network subscribers that are connected to the control node via a closed ring-shaped data path.

Networks are used in industrial automation in order to connect the distributed arrangement of devices of an actuator/sensor level to the control level. The networks, also called field bus systems, normally have the serial bus that may be an electrical line, an optical fibre or a radio cable, for example. All network subscribers are connected to the bus, with a distinction being drawn between active and passive bus subscribers.

The active network subscribers in the field bus system are the control nodes that regulate the data traffic on the serial bus. Such a control node is an industrial PC that is used as a process control computer on a production line, for example. The control nodes have bus access authorization and can output data onto the serial bus without an external request. The passive network subscribers are the machine peripherals, e.g. I/O devices, valves, drives, sensors, transducers, etc. They do not normally have bus access authorization, i.e. they can only acknowledge received data and transmit data via the bus on request.

The communication standard used for data transmission in field bus systems is preferably the Ethernet standard. In Ethernet networks, the data to be transmitted are encapsulated in the form of data packets, subsequently also referred to as data messages. The Ethernet messages can have a data length of up to 1500 bytes, with control data that have a start identifier, a destination and source address, a data packet type and an error mechanism being included in addition to the useful data.

A preferred topology for Ethernet networks is the ring bus system, in which a data message is routed from the control node through all network subscribers on the bus before arriving at the control node again. In order to achieve high data transmission rates, particularly giga bit data transmission rates, Ethernet networks are preferably operated in full-duplex mode. To this end, the data path in the Ethernet network has separate transmission in the outbound and inbound directions, so that simultaneous sending and receiving is made possible for the network subscribers.

In this case, the network subscribers form a chain starting from the control node, the outbound route and the inbound route on the ring-shaped data path being shorted after the last network subscriber, subsequently also referred to as the head subscriber. The network subscribers are then designed such that they can perform data interchange both on the outbound route and on the inbound route with data messages transiting onto the ring-shaped data path. Such a field bus system operating on the basis of the Ethernet principle is the EtherCAT bus, for example, on the basis of which the invention will be described below. The invention can also be used in the case of other bus systems, however, particularly field bus systems such as the ProfiNet system.

In order to be able to perform fast regulatory operations in automation engineering using a field bus system, one objective is to achieve short transit times for the useful data that are interchanged between the control node and the remainder of the network subscribers. At high data transmission rates on the serial bus, the transit time through the network subscribers is increasingly the limiting factor. The shortest cycle time for a control process is dependent on when the control node receives the input data for the next cycle on the basis of the output data from the previous cycle.

At the end of a control cycle, the control node outputs the control process output data in the form of a data message on the outbound route of the data path, the network subscribers reading in the output data associated with the respective network subscriber during transit on the outbound route of the data path. The network subscriber then executes a local network subscriber process on the basis of the output data that have been read in, in order to ascertain input data for the next control process cycle of the control node. These input data are then usually written to the data message that is output by the control node or to a further data message sent by the control node, by the network subscribers on the inbound route. After receiving the data message, the control node then processes the input data in the next control process cycle. The data message thus transits all network subscribers in the network twice, on the outbound route of the data path, in order to write the output data of the preceding control cycle to the network subscribers, and on the inbound route, in order to read in the input data for the next control cycle.

In order to shorten the transit time through the network for the data that are required for a control process, the procedure adopted is such that the control node provides the data messages that are output on the data path with an identifier and the head subscriber, which—as seen from the control node in the chain of network subscribers—forms the termination of the chain, has additional functionalities, namely a filter functionality, in order to use the prescribed identifier to prevent the further transport of the data messages with the corresponding identifier on the inbound route when data messages transit through the head subscriber on the outbound route, and a transmission functionality, in order to independently output data messages on the inbound route at a prescribed instant.

This approach provides the opportunity for the data messages for writing the output data from a control process and for reading in the input data for the next control process to be physically isolated and executed at independent times with respect to one another. The data messages transit through each network subscriber only once, the write data messages transiting through the network subscribers on the outbound route of the data path and the read data messages transiting through the network subscribers on the inbound route. The sending of the read and write data messages can be optimally coordinated to the cycle time of the control process under time control.

A control process in the network is executed in the following manner. Following termination of a control process cycle, the control node outputs the output data in the form of a write data message on the outbound route of the data path, with the network subscribers reading the output data associated with the respective network subscriber from the write data message on transit of the write data message on the outbound route of the data path. Each network subscriber then performs a local network subscriber process with the output data that have been read. The input data that result from this network subscriber process are then collected by the head subscriber in the chain with a read data message that is output by this head subscriber onto the inbound route of the data path and are fed back to the control node. The head subscriber simultaneously uses the identifier of the write data message to block the further transport of the write data message following transit on the inbound route.

FIG. 1 schematically shows the network design explained above. The network has a control node 1 to which a chain of eight network subscribers 3, which are consecutively numbered 301, 302, . . . , 308 in FIG. 1, is connected via a data path 2. The data path 2 has an outbound route 21 and an inbound route 22. The control node 1 has a transmission unit TX11 and a reception unit RX12. The transmission unit TX11 is connected to the outbound route 21 via a first port and the reception unit RX12 is connected to the inbound route 22 via a second port. In addition, the control node 1 contains a control unit 13 that is connected to the transmission unit TX11 and the reception unit RX12 via control lines.

Each of the eight network subscribers 3 shown has, as shown by the detailed view in FIG. 1, a first port with a first reception unit RX31 for the purpose of receiving the data messages from a previous network subscriber via the outbound route 21 and a second port with a first transmission unit TX32 for the purpose of forwarding to the next network subscriber via the outbound route 21. In addition, each network subscriber has a third port with a second reception unit RX33 for the purpose of receiving the data messages via the inbound route 22 from a previous network subscriber and a fourth port with a second transmission unit TX34 for the purpose of forwarding via the inbound route 22 to the subsequent network subscriber. Between the first reception unit RX31 and the first transmission unit TX32 and between the second reception unit RX33 and the second transmission unit TX34, a processing unit 35 is connected to the control lines connecting the first reception unit RX31 and the first transmission unit TX32 and connecting the second reception unit RX33 and the second transmission unit TX34, in order to perform data interchange with the transiting data messages both on the outbound route 21 and on the inbound route 22 of the data path 2.

The outbound route 21 and the inbound route 22 of the data path 2 are shorted by the last network subscriber 3 in the chain, the head subscriber 308. The head subscriber 308 is of similar design to the usual network subscribers and, as shown by the detailed view in FIG. 1, additionally has a programmable memory area 36 with a message memory 361, a first buffer store 362 and a second buffer store 363. The programmable memory area 36 may be part of the memory that is usually already in place in every network subscriber 3 and that is preferably integrated in the processing unit 35. There is therefore the option of using any network subscriber as the head subscriber 308 in principle. At the head subscriber 308, the first transmission unit TX32 and the second reception unit RX33 are connected to one another in order to set up a short 23 for the outbound route 21 and the inbound route 22 of the data path 2.

FIG. 1 additionally shows that the control node 1 outputs a write data message 5 on the outbound route 21 of the data path 2 while the head subscriber 308 sends a read data message 6 on the inbound route. Both data messages preferably have the same data structure and are made up of a header with a reception identifier and a destination and source address, a data area and also a trailer that comprises a packet length and an error recognition mechanism.

For the purpose of executing a control task, the data area of the data messages that is provided between the header and the trailer contains the process data that are required for the control task. In this case, the write data message 5 that is output by the control node 1 depicts the process map following termination of a control process cycle, with the output data ascertained in the control process being included for the connected network subscribers. By contrast, the read data message 5 is used to collect the input data for the next control process cycle of the control node 1, which are ascertained by network subscribers 3 on the basis of the output data from the previous control process cycle.

After having transited through all network subscribers 3 on the outbound route 21, the write data message 5 from the control node 1 is erased by the head subscriber 308 following removal of the useful data. In addition, the head subscriber 308 outputs the read data message 6 onto the inbound route 22 under time control, all network subscribers 3 including the head subscriber 308 writing the useful data that are provided for the control node 1 to said read data message.

The additional filter and transmission functionality of the head subscriber 308 in the network allows the writing and reading of the process data to be performed independently of one another with separate data messages, each of these data messages needing to transit through each network subscriber 3 only once, either on the outbound route 21 or on the inbound route 22 of the data path 2. This approach allows the transit time for the process data of the network to be shortened. In particular, there is the option of optimally basing the instant for reading in the input data from the network subscribers 3 for the next control process cycle on the instant at which these input data are provided by the network subscribers 3, by virtue of appropriate control of the transmission functionality of the head subscriber 308.

Figure 2:
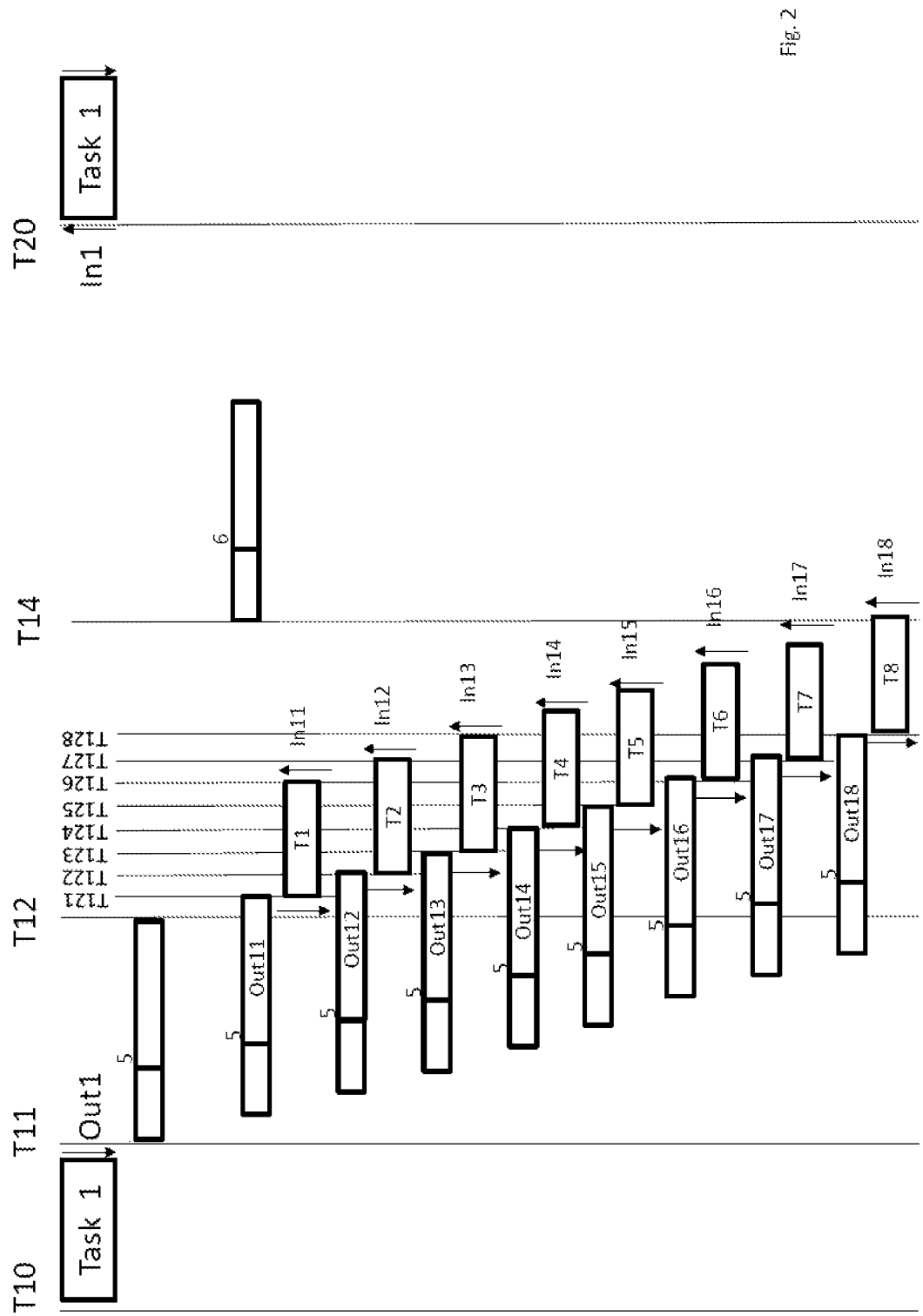
FIG. 2 shows a first embodiment of flow control for data transmission in a network as shown in FIG. 1.

The process data interchange using read and write data messages can take place in the manner shown in FIG. 2. FIG. 2 shows the process data interchange between two cycles of a control process Task1 that is executed by the control unit 13 of the control node 1. At the instant T10, a first cycle of the control process Task1 is executed. The output data Out1 that are available for the network subscribers 3 following termination of the control process are then converted by the control unit 13 of the control node 1 into the write data message 5, each network subscriber having been assigned a data section in the data area: the first data section is assigned to the first network subscriber 301, the second data second is assigned to the second network subscriber 302, etc.

At the instant T11, the control node 1 begins to output the write data message 5 onto the outbound route 21. At the instant T12, the complete write data message 5 has been sent by the control node 1. The write data message 1 is then present on the first network subscriber 301 in the chain downstream of the control node 1 and has been received there completely at the instant T121. On transit of the write data message 5, the network subscriber 301 removes the output data Out11 provided in the write data message for the network subscriber and then forwards the write data message 5 to the next network subscriber 302. The network subscriber 301 uses the removed output data Out11 to start the local network subscriber process T1, from which the input data In11 of the network subscriber 301 for the next control process cycle of the control unit 1 are then obtained. At the instant T122, the write data message 5 is then present in the subscriber 302 completely, which removes the associated output data Out12 and begins the local network subscriber process T2. The same operation is repeated for all further network subscribers 302, . . . , 307 in the chain up to the head subscriber 308. At the instant T128, as FIG. 2 shows, the head subscriber 308 will then receive the complete write data message 5. The head subscriber 308 then removes the associated output data from the write data message 5 and initiates the local network subscriber process T8.

The process cycles of the local network subscriber processes T1, . . . , T8 of the individual network subscribers can be of the same length in this case, as shown in FIG. 2. However, they can also have a different cycle duration. As FIG. 2 shows, the local network subscriber processes can be initiated by the respective network subscriber immediately after the output data has been read in. Alternatively, however, there is also the option for the local network subscriber processes to be initiated at the same instant under time control. In addition, the data sections that are assigned to each network subscriber may be arranged in any order in the data area of the write data message 5.

After having transited through all network subscribers on the outbound route 21, the write data message 5 from the control node 1 is filtered out by the head subscriber 308 using its identifier and is no longer fed back to the control node 1 via the short 23 at the output of the head subscriber 308 between the first transmission unit TX32 and the second reception unit RX33 on the inbound route 22. For the read data message 6 sent by the head subscriber 308 on the inbound route 22, there is therefore no danger of collision with the write data message 5.

At the instant T14, as FIG. 2 shows, all network subscribers 3 have terminated their local network subscriber process. The head subscriber 308 then also starts to output the read data message 6 at this instant T14, said read data message being transmitted through all network subscribers 3 to the control node 1 on the inbound route 22 of the data path 2. For each network subscriber 3, the data area of the read data message 6 contains a data section in which the relevant network subscriber can read in its input data In11, . . . , In18 from the local network subscriber process for the next control process cycle of the control node 1. The first data section is assigned to the head subscriber 308, the second data section is assigned to the seventh network subscriber 307, etc. Since the read data message 6 is sent only when all local network subscriber processes T1, . . . , T8 are at an end and the input data In11, . . . , In18 to be read in are available, it is alternatively possible, as in the case of the write data message 5, for the data sections that are assigned to each network subscriber to be arranged in any order in the data area of the read data message 6.

On transit of the read data message 6, each network subscriber 3 enters the input data and then forwards the read data message 6 to the next network subscriber until the read data message 6 is then present in the control node 1 completely at the instant T20. For the input data In1, the control unit 12 of the control node 1 then starts the next cycle of the control process Task1.

The output of the read data message 6 by the head subscriber 308 on the inbound route 22 is effected under time control always such that the read data message transits to a network subscriber in the chain only when the relevant local network subscriber process has terminated and the input data are available in the network subscriber, so that the network subscriber can insert the input data without delay into the data section provided for this purpose in the read data message.

In this case, as FIG. 2 shows, the head subscriber 308 can output the read data message 6 only when all local network subscriber processes have terminated and the input data of all network subscribers are available for reading into the read data message 6. Alternatively, however, the head subscriber 308 can actually feed the read data message 6 into the inbound route 22 earlier given appropriate time control. The data sections assigned to the individual network subscribers are then preferably arranged in the data area of the read data message such that they take account of the respective instant at which the input data are present in the individual network subscribers.

Figure 3:
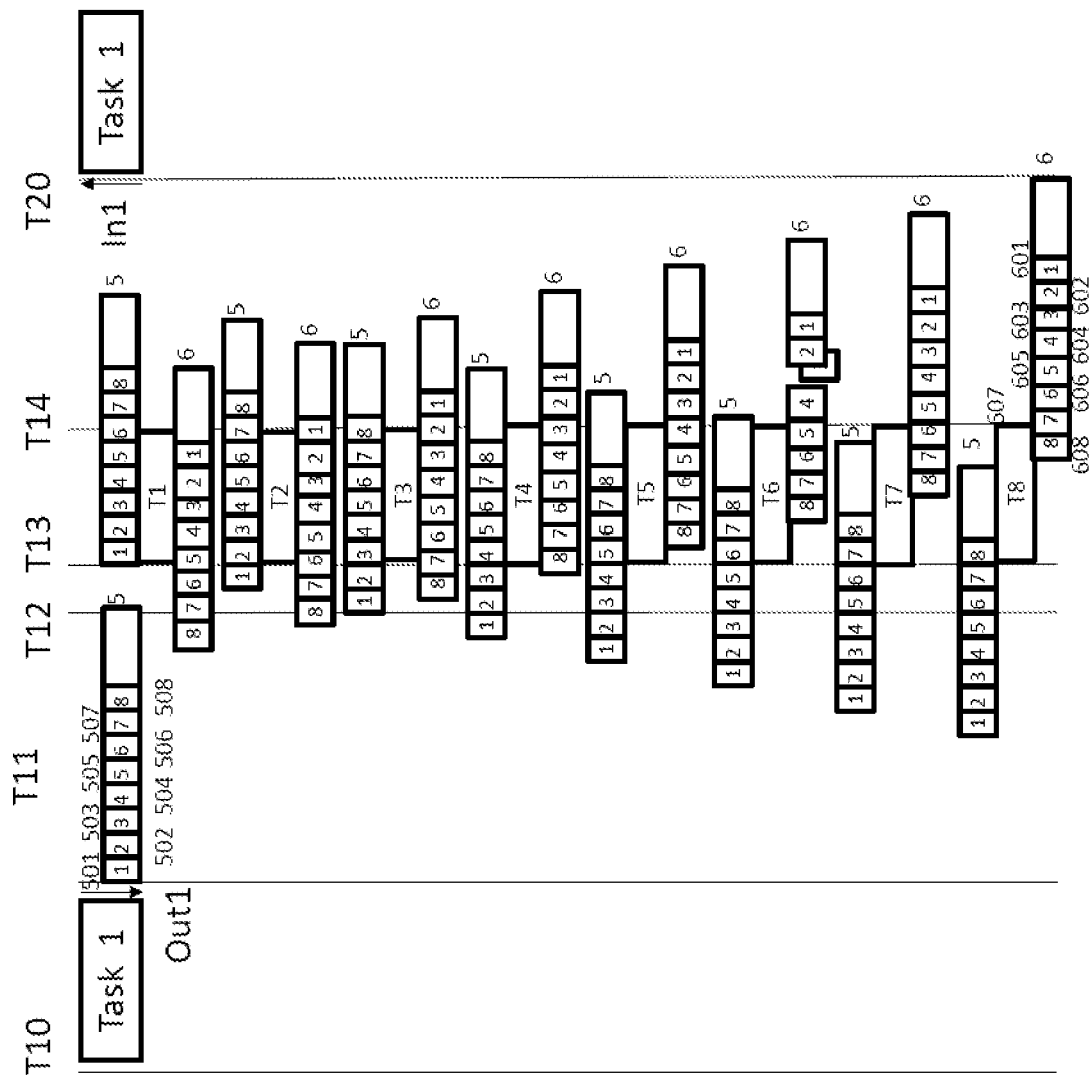
FIG. 3 shows a second embodiment of flow control for data transmission in a network as shown in FIG. 1.

Optimization of the data transmission of process data using separate read and write data messages on the outbound route 21 and the inbound route 22 of the data path 2 is shown in FIG. 3. The output data Out1 for the network subscribers 3 in the write data message 5 are then arranged such that the output data for the network subscribers are sorted in reverse order with respect to the order of the network subscribers in the chain, with the output data for the head subscriber 308 first. In the write data message 5, the first data section 508 is then assigned to the head subscriber 308, the second data section 507 is assigned to the seventh network subscriber 307, etc. The respective data section of the network subscribers 3 in the write data message 5 additionally contains a checksum that is computed by the control node 1 for the output data in the respective network subscriber and that is appended to the output data.

FIG. 3 shows the process data interchange between two cycles of the control process Task1 with an optimized write data message 5 of this kind. At the instant T10, the first cycle of the control process Task1 is executed. The output data available for the network subscribers 3 following termination of the control process are then converted by the control unit 12 of the control node 1 into the optimized write data message 5. The control node 1 begins to output the write data message 5 onto the outbound route 21 at the instant T11.

At the instant T12, the write data message 5 has been output by the control node 1 completely. The write data message 5 is then, as shown in FIG. 3, forwarded on the outbound route 21 by the network subscribers 3 in the chain until the respective data section with the output data that is associated with the network subscriber is in the transit area for the network subscriber 3. The presentation in FIG. 3 additionally shows that the associated data sections in the data area of the write data message 5 are received by the individual network subscribers 3 in the chain essentially all simultaneously at the instant T13. At the instant T13, the first network subscriber 301 in the chain has received the write data message 5, including the data section 501 associated with the network subscriber 301. The first network subscriber 301 then removes the output data Out11 and begins the local network subscriber process T1. In addition, at the instant T13, the write data message 5 is also present in the second network subscriber 302 in the chain, including the associated data section 502, which means that the output data Out12 can be removed and the local network subscriber process T2 begun. The same applies to all further network subscribers 302, . . . , 307 in the chain, including the head subscriber 308. At the instant T13, all network subscribers 3 have then received the associated data section of the write data message 5 in order to remove the output data from the write data message 5 and to initiate their local network subscriber process.

The effect achieved by the order of the data sections associated with the respective network subscribers in the data area of the write data message, which order is the reverse of the order of the network subscribers in the chain, is that the respective output data can be read in by all network subscribers essentially simultaneously. This is the case, by way of example, when the transit time for the data message processing is 0.5 μsec for each network subscriber, each network subscriber having an assigned data section of 60 bytes in the write data message 5. Given a data transmission rate of 1 GBaud, at which the transmission of 60 bytes (60*8=480 bits) lasts for 0.48 μsec, the transmission time for the data of a network subscriber 3 (0.048 μsec) is therefore approximately the same as the transit time through a network subscriber 3 (0.5 μsec), and therefore the output data are present essentially simultaneously in all eight network subscribers 3, namely at the instant T13, as shown in FIG. 3. The network subscribers 3 can then all initiate their local network subscriber process essentially simultaneously after their output data have been read in.

Since the output data associated with the individual network subscribers 3 each have a separate checksum, there is furthermore the option for each network subscriber, without having to receive and evaluate the whole write data message 5, to be able to verify error-free transmission using the checksum associated with its output data after its data section in the write data message has actually been read in. The network subscriber thus does not need to wait for transit of the whole write data message before it initiates its local network subscriber process.

A further optimization for the transit time can be achieved by virtue of, as shown further in FIG. 3, the data sections 601, . . . , 608 being arranged in the read data message 6 transmitted by the head subscriber 308 such that the input data of the network subscribers in the data area of the read data message 6 are sorted in the order of the network subscribers in the chain, with the input data of the head subscriber 308 last. The head subscriber 308 can then actually output the read data message 6 on the inbound route 22 of the data path 2 under time control before all network subscribers have ended their local network subscriber process at the instant T14.

The data message 6 is output by the head subscriber 308 such that the last data section 608 of the read data message 6 is sent by the head subscriber 308 only when the local network subscriber process T8 is at an end, so that new input data In18 can be entered in the data section 608. In addition, the read data message 6 is sent such that the penultimate network subscriber 307 in the chain forwards the data section 607 only when the local network subscriber process T7 in the network subscriber 307 is at an end and the new input data In17 can be entered into the data section 607. The same applies to all further network subscribers 306, . . . , 301 in the chain in relation to the associated data section 606, . . . , 601 in the read data message 6.

The instant of output of the read data message 6 on the inbound route 22 is chosen by the head subscriber 308 under time control such that the transit time through the network subscribers means that the data section associated with the network subscribers in the read data message 6 is present in the corresponding network subscriber when the local network subscriber process thereof is at an end and the resultant input data are present. As shown by the timing in FIG. 3, the network subscribers 3 can then read in their input data into the read data message essentially simultaneously, said read data message then being present at the control node 1 completely again at the instant T20, said control node then being able to start the next control process cycle Task1.

The head subscriber 308 is programmed such that it filters out the write data messages transmitted by the control node 1 using the data message identifier. To this end, the head subscriber 308 examines the data message identifier that the header of the write data message 5 contains. This is preferably effected such that the head subscriber 308 compares the read data message identifier with data message identifiers that the message memory 361 of the configurable memory area 36 contains. If the identifiers match, the write data message 5 is prevented from being transported further on the inbound route 21 of the data path 2, and is preferably erased by the head subscriber 308.

As a further security measure besides a checksum, the write data messages preferably contain an additional register data field, also called a working counter, that is provided with a starting value by the control node 1. The network subscribers are then designed to increment the register data field of the transited data message on data interchange with the relevant data message. On the basis of the value in the register data field, the control node 1 can establish, when the data message is received by the control node 1 again after circulating on the ring-shaped data path, whether the network subscribers have executed the data interchange correctly.

In order to render the security measure accessible to the control node 1 even when the write data message is filtered out by the head subscriber 308, the head subscriber 308 is preferably designed such that it reads the value of the register field of the write data message 5 prior to erasure and stores it in the first buffer store 362. The buffer-stored value of the register field of the write data message 5 can then be returned to the control node 1 for evaluation with the read data message 6 that is output onto the inbound route 22 by the head subscriber 308.

Figure 4:
FIG. 4 shows an embodiment of a message memory in a head subscriber.

The message memory 361 provided in the head subscriber 308 is preferably configured by the control node 1 in the start up phase of the network. The control node 1 specifies for the head subscriber 308 the data message identifiers of the write data messages that are to be blocked from being forwarded and the instants for sending the read data messages. In addition, the control node 1 can specify, in the configurable message memory 361, the actions to be performed by the head subscriber 308 with the data messages, i.e. sending or blocking or else reading of the register field of a write data message that is to be blocked. FIG. 4 shows a possible appearance of the message memory 361 in the head subscriber 308. The message memory has three columns that store the instant, message identifier and action to be executed, e.g. store working counter at address ADR1 in the first character memory 361.

With the data interchange method explained above, there is the option of optimizing the data transit times by virtue of reading and writing of the process data taking place independently of one another in the full-duplex data transmission method, and each data message needing to transit through each network subscriber only once. Since the data interchange takes place cyclically, appropriate time control can ensure that, even if a plurality of control tasks are executed in parallel, the associated read and write data messages are transmitted on the outbound route and the inbound route without collision.

Besides the cyclic data transmission operations for the circulation of process data from control tasks, however, acyclic data transmission operations are also performed in networks, particularly also in automation engineering, e.g. in order to transmit parameters pertaining to the individual devices of the sensor/actuator level or to query status data. The data transmission is normally effected such that between the cyclic data messages acyclic data messages are also transmitted on the data path 2 from the control node 1 to the network subscribers 3 and then returned to the control node 1 again by the network subscribers 3.

The head subscriber 308 feeds back the acyclic data messages from the outbound route 21 onto the inbound route 22 of the data path 2 via the short 23 from the first transmission unit TX32 to the second reception unit RX33. In this case, acyclic data messages are identified by the head subscriber 308 preferably by virtue of the identifier that the header of the acyclic data messages contains not matching one of the identifiers stored in the configurable message memory of the head subscriber. This then indicates to the head subscriber 308 that the corresponding acyclic data message is not meant to be blocked from forwarding on the inbound route.

This feedback of the acyclic data messages by the head subscriber 308 from the outbound route 21 to the inbound route 22 of the data path 2 runs the risk that the acyclic data messages will collide with a time-controlled read data message 6 from the head subscriber. To prevent this, the head subscriber, as FIG. 1 shows, additionally has the second buffer store 37, preferably an FIFO memory, which is designed so that when the head subscriber 308 establishes that a read data message 6 is intended to be sent at the same time as the acyclic data message, it buffer-stores the acyclic data message and forwards it only when the inbound route is free again.

Figure 5:
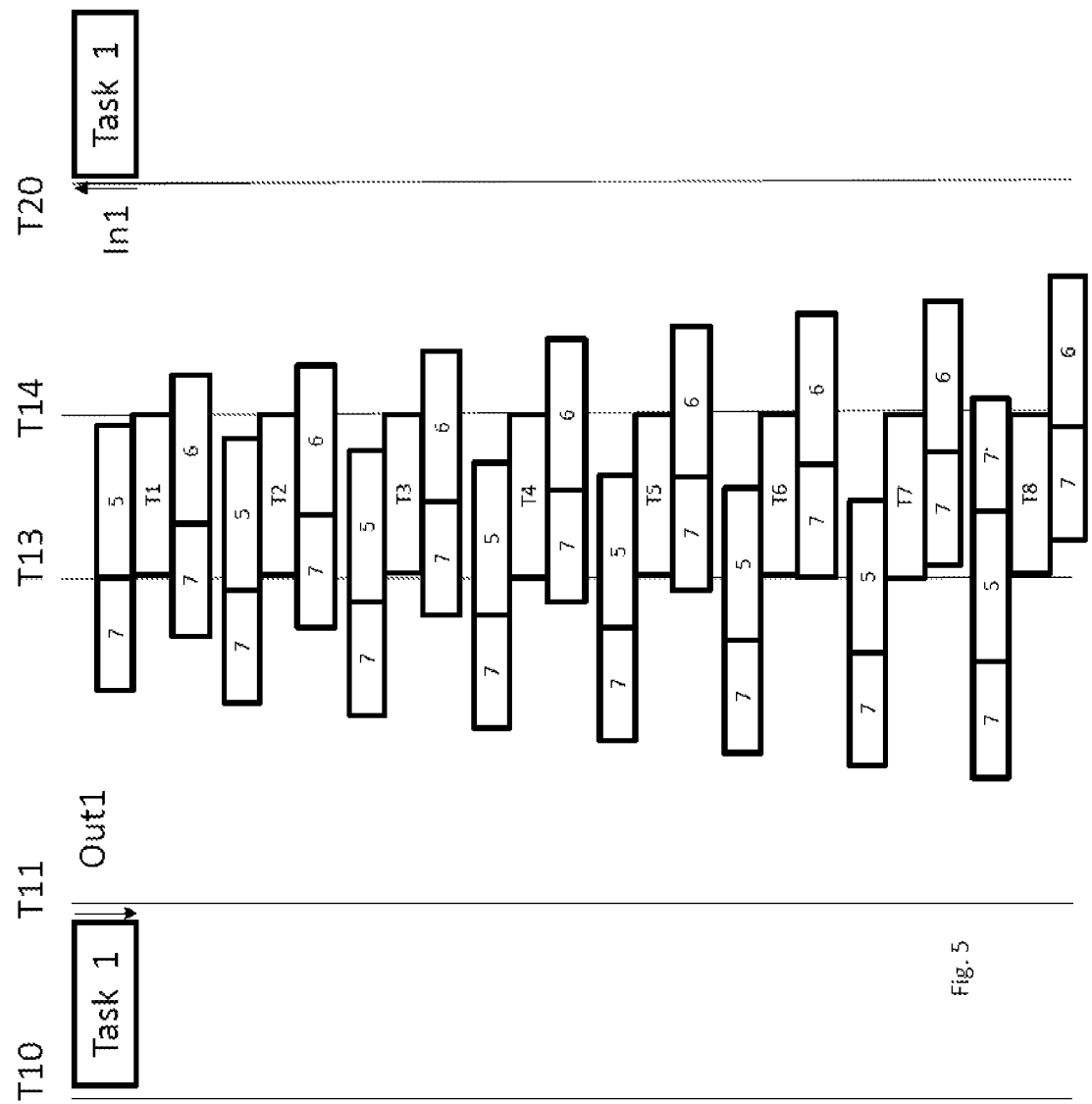
FIG. 5 shows a third embodiment of flow control for data transmission in a network as shown in FIG. 1.

FIG. 5 shows the process data interchange from FIG. 3, wherein additionally, after the write data message 5, an acyclic data message 7 is output by the control node on the outbound route 21 of the data path 2. In this case, FIG. 5 shows the write data message 5 at the instant T13 at which all networks subscribers 3 have received the associated data section of the write data message 5 in order to remove the output data from the write data message 5 and initiate their local network subscriber process. As FIG. 5 shows, the acyclic data message 7 that is then sent from the control node 1 to the write data message 5 is present at the first network subscriber 301 in the chain at the instant T13.

In addition, FIG. 5 shows the read data message 6 at the instant T14 at which all network subscribers 3 have terminated their local network subscriber process. The data message 6 is output by the head subscriber 308 such that at the instant T14 the last data section 608 of the read data message 6 is still in the head subscriber 308, which means that new input data can be entered into the data section 608. As FIG. 5 additionally shows, the acyclic data message 7 follows the read data message 6 and is still completely in the head subscriber 308 at the instant T14. The acyclic data message 7 is buffer-stored by the head subscriber 308 in this case and forwarded on the inbound route 22 only after the read data message 6 has been sent. If the acyclic data message 7 had been forwarded without buffer-storage by the head subscriber 308, the acyclic data message (denoted 7' in FIG. 5) would have actually already left the head subscriber 308 again in part, as a result of which there would have been a collision with the read data message on the inbound route 22.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A network having a control node and a plurality of network subscribers that are connected to the control node via a closed ring-shaped data path,
   wherein the network subscribers form a chain, starting from the control node, with a head subscriber as a termination for the chain, and the closed ring-shaped data path transits through the network subscribers on both an outbound route and an inbound route,
   wherein the control node is designed to output data messages with identifiers onto the closed ring-shaped data path,
   wherein the network subscribers are designed to perform data interchange on the outbound route and on the inbound route with data messages transiting through on the closed ring-shaped data path, and
   wherein the head subscriber in the chain has a filter functionality, in order to use a prescribed identifier to block the further transport of data messages with the corresponding identifier on the inbound route following transit of data messages through the head subscriber on the outbound route, and a transmission functionality, in order to output data messages onto the inbound route at prescribed instants.

2. The network according to claim 1,
   wherein the control node is designed to cyclically perform a control process in order to ascertain output data for the network subscribers on the basis of input data of the network subscribers, wherein the control node, following termination of a control process cycle, outputs the output data in the form of at least one write data message onto the outbound route of the closed ring-shaped data path, wherein the network subscribers, on transit of the write data message on the outbound route of the closed ring-shaped data path, read output data associated with the respective network subscriber from the write data message, wherein each network subscriber is designed to cyclically perform a network subscriber process in order to ascertain input data for the next control process of the control node on the basis of the output data that have been read, wherein the head subscriber in the chain, following transit of the write data message through the head subscriber, blocks the further transport of the write data message on the inbound route and outputs a read data message onto the inbound route of the closed ring-shaped data path at a prescribed instant, and wherein the network subscribers, on transit of the read data message on the inbound route of the closed ring-shaped data path, read the input data of the network subscriber for the next control process cycle into the read data message.

3. The network according to claim 2, wherein the prescribed instant for the output of the read data message onto the inbound route of the closed ring-shaped data path is chosen by the head subscriber such that a data area associated with a network subscriber in the read data message transits through the corresponding network subscriber only following termination of the network subscriber process.

4. The network according to claim 2, wherein the control node is designed to arrange the output data for the network subscribers in the write data message such that the output data for the network subscribers are sorted in reverse order with respect to the order of the network subscribers in the chain, with the output data for the head subscriber first.

5. The network according to claim 3, wherein the control node is designed to arrange the output data for the network subscribers in the write data message such that the output data for the network subscribers are sorted in reverse order with respect to the order of the network subscribers in the chain, with the output data for the head subscriber first.

6. The network according to claim 4, wherein the control node is designed to ascertain a separate checksum for the output data from each network subscriber and to include it in the transmission in the write data message together with the output data from each network subscriber.

7. The network according to claim 5, wherein the control node is designed to ascertain a separate checksum for the output data from each network subscriber and to include it in the transmission in the write data message together with the output data from each network subscriber.

8. The network according to claim 2, wherein the head subscriber is designed to arrange the data areas provided for the network subscribers in the read data message such that the input data of the network subscribers are sorted in the read data message in the order of the network subscribers in the chain, with the input data of the head subscriber last.

9. The network according to claim 6, wherein the head subscriber is designed to arrange the data areas provided for the network subscribers in the read data message such that the input data of the network subscribers are sorted in the read data message in the order of the network subscribers in the chain, with the input data of the head subscriber last.

10. The network according to claim 1,
wherein the control node is designed to provide the data messages with a register field containing a starting value,
wherein the network subscribers are designed to increment the register field of the data messages transiting through on the closed ring-shaped data path in the event of a data interchange with the corresponding data message, and
wherein the head subscriber is designed to read and buffer-store the value of the register field for data messages that the head subscriber blocks, on the outbound route using the prescribed identifier, from further transport on the inbound route in order to send the buffer-stored value to the control node at a later instant with a data message that is output onto the inbound route by the head subscriber.

11. The network according to claim 1, wherein the head subscriber has a configurable message memory for the filter functionality and the transmission functionality, which message memory contains the identifiers of the data messages that need to be blocked from being transported further on the inbound route of the closed ring-shaped data path and the prescribed instants for the output of the data messages onto the inbound route.

12. The network according to claim 1, wherein the head subscriber has a buffer store that is designed to buffer-store data messages that are sent acyclically by the control node if forwarding of the data message that is sent acyclically by the control node on the inbound route of the closed ring-shaped data path would collide with a data message that is to be sent on the inbound route by the head subscriber.

13. A head subscriber for use in a network according to claim 1, which has a filter functionality, in order to use a prescribed identifier to block the further transport of data messages following transit of data messages through the head subscriber, and a transmission functionality, in order to output data messages at prescribed instants.

14. A data transmission method for operating a network, the network having a control node and a plurality of network subscribers that are connected to the control node via a closed ring-shaped data path,
wherein the network subscribers form a chain, starting from the control node, with a head subscriber as a termination for the chain, and the closed ring-shaped data path transits through the network subscribers on both an outbound route and an inbound route,
wherein the control node is designed to output data messages with identifiers onto the closed ring-shaped data path,
wherein the network subscribers are designed to perform data interchange on the outbound route and on the inbound route with data messages transiting through on the closed ring-shaped data path, and
wherein the head subscriber in the chain has a filter functionality, in order to use a prescribed identifier to block the further transport of data messages with the corresponding identifier on the inbound route following transit of data messages through the head subscriber on the outbound route, and a transmission functionality, in order to output data messages onto the inbound route at prescribed instants.

* * * * *